United States Patent [19]

Bone et al.

[11] 4,029,823

[45] June 14, 1977

[54] METHOD OF MAKING A DRY PET FOOD HAVING A MARBLED MEAT-LIKE TEXTURE

[75] Inventors: David P. Bone, Palatine; Edward L. Shannon, Barrington, both of Ill.

[73] Assignee: The Quaker Oats Company, Chicago, Ill.

[22] Filed: June 12, 1974

[21] Appl. No.: 478,754

[52] U.S. Cl. .............................. 426/249; 426/272; 426/497

[51] Int. Cl.² .......................................... A23L 1/27

[58] Field of Search ............ 44/104, 293, 272, 249, 44/1, 364; 426/516, 497

[56] References Cited

UNITED STATES PATENTS

| | | | |
|---|---|---|---|
| 3,343,963 | 9/1967 | Kjelson | 426/104 X |
| 3,380,832 | 4/1968 | Bone | 426/272 X |
| 3,467,525 | 9/1969 | Hale | 426/293 X |
| 3,759,723 | 9/1973 | Gunson | 426/272 |
| 3,765,902 | 10/1973 | Charter | 426/249 X |
| 3,800,053 | 3/1974 | Lange | 426/364 |
| 3,840,679 | 10/1974 | Lippa | 426/104 |
| 3,862,336 | 1/1975 | Kofsky | 426/1 |

FOREIGN PATENTS OR APPLICATIONS

| | | | |
|---|---|---|---|
| 27,526 | 8/1968 | Japan | 426/104 |

Primary Examiner—Robert Halper
Attorney, Agent, or Firm—Richard H. Shear; Mathew R. P. Perrone, Jr.

[57] ABSTRACT

A method for producing a dry pet food resembling marbled meat in appearance and having a moisture content of less than 15 percent by weight is obtained by utilizing two doughs having a reduced amount of amylaceous ingredients within the pet food as well as using specific types of proteinaceous adhesives in conjunction with plasticizing agents. The two doughs are cooked, extruded together and dried to reduce the moisture content of the product to less than 15 percent by weight.

12 Claims, 2 Drawing Figures

1

METHOD OF MAKING A DRY PET FOOD HAVING A MARBLED MEAT-LIKE TEXTURE

BACKGROUND OF THE INVENTION

1. Field of the Invention

This invention relates to a dry, meaty pet food having an appearance and texture that resembles meat being marbled throughout with fat, and which has a moisture content of less than 15 percent by weight.

2. Description of the Prior Art

Only one pet food is known to exist which resembles meat marbled throughout with fat. This product and processes for manufacturing it are clearly described in U.S. Pat. Nos. 3,380,832 and 3,765,902. This product, however, is of the semi-moist type characterized as having a moisture content of between 20 and 50 percent by weight.

Conventional dry type pet foods are characterized as having a moisture content of 15 percent by weight or less. No product resembling meat marbled throughout with fat is known to exist as a dry pet food. These conventional dry pet foods when distributed in the normal marketing system are characterized as having hard, brittle structures and as a consequence relatively small particle size and only a nominal resemblance to meat. A conventional dry pet food typically has the following formulation:

|  | Percent by Weight |
|---|---|
| Amylaceous ingredients | 24–50 |
| Animal protein source | 5–25 |
| Vegetable protein source | 10–30 |
| Fat source | 5–15 |
| Supplements (vitamins, minerals, flavoring, etc.) | 1–5 |
| Water | 5–15 |

Due to the hard, brittle nature of these dry pet foods, it is often necessary to moisten them with water or mix them with moist foods in order to increase their palatability to a sufficient degree to obtain consumption. Furthermore, as shown by the above formulation, conventional dry pet foods often contain amylaceous ingredients including cereal grains at levels as high as 50 percent. The amylaceous content at any level, and especially at a high level of amylaceous ingredients is a stigma against a meat image that pet food manufacturers attempt to convey to customers of dry type pet foods. For these reasons it would be beneficial to provide a dry pet food having a soft, elastic texture and that resembles raw meat marbled throughout with fat.

SUMMARY OF THE INVENTION

It is, therefore, an object of this invention to provide a method of producing a dry pet food that resembles meat being marbled throughout with fat.

Yet another object of this invention is to provide a processed pet food which ranks high in palatability and acceptability to animals.

Still another object of the invention is to provide a dry pet food having a soft, meat-like texture and remains so during storage, i.e., 24 months.

These and other objects of this invention are accomplished by mixing two separate doughs from conventional dry pet food ingredients containing different coloring additives along with specific proteinaceous adhesives and plasticizing agents while limiting the use of amylaceous ingredients to 25 percent by weight or less and further processing the mixture to yield semi-moist like yet dry pet food resembling marbled meat. The pet food thus produced will be capable of being stored as a dry pet food, yet will not need additional moisture to increase its palatability.

BRIEF DESCRIPTION OF THE DRAWING

This invention may be more fully illustrated but is not limited by the enclosed drawings wherein.

DETAILED DESCRIPTION OF THE INVENTION

Figure 1:
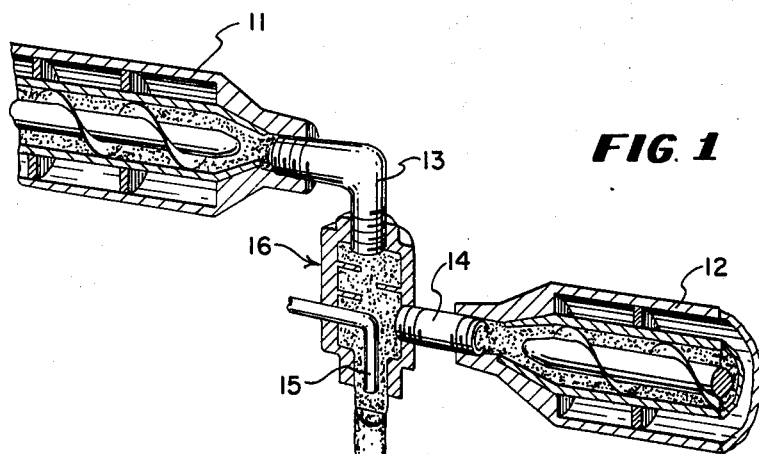
FIG. 1 illustrates a perspective view of an apparatus used to carry out the process of the invention.
Figure 2:
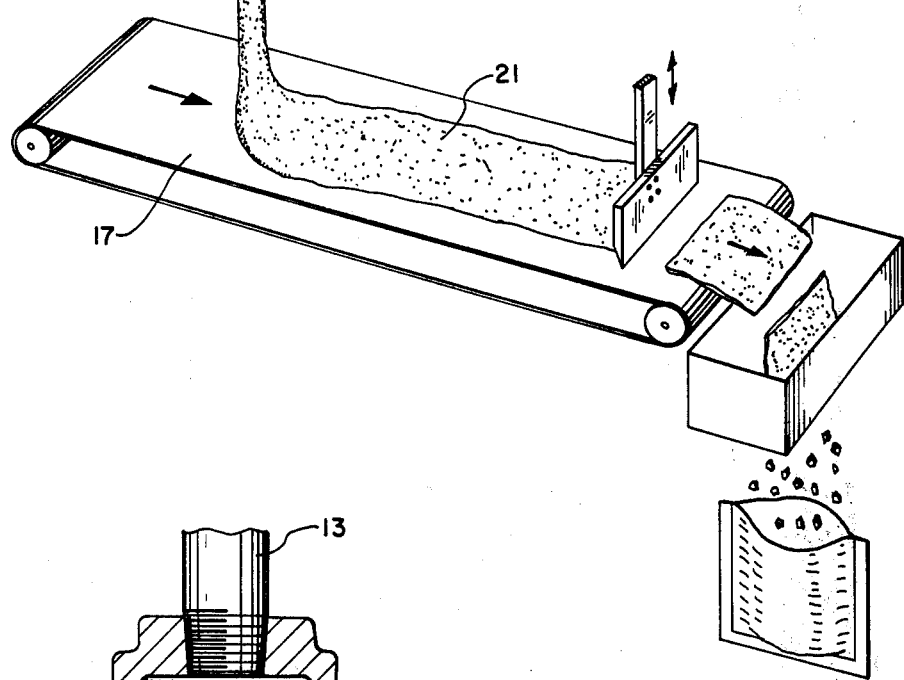
FIG. 2 illustrates more closely a cross-section of a die used to mix the doughs.
Figure 2:
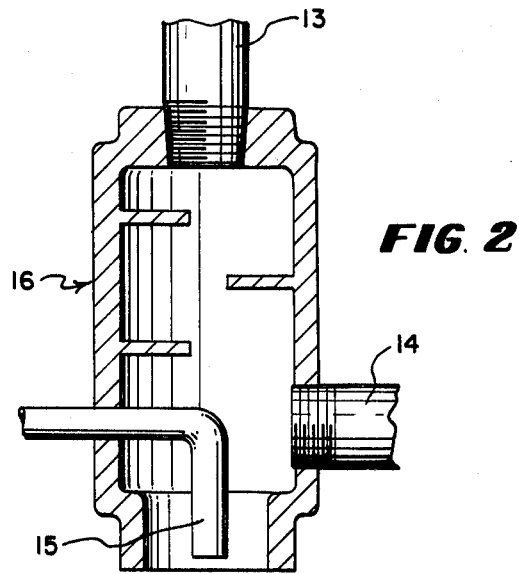

In copending application by Bone et al. filed along with the present application, U.S. patent application Ser. No. 478,761, a dry pet food having a substantially unexpanded or solid texture that is soft, elastic, and meat-like in appearance is disclosed. The present invention relates to a process for producing a dry pet food having a similar composition as that pet food yet resembling marbled meat in both texture and appearance. The product is achieved through the use of two doughs.

In copending U.S. patent application Ser. No. 478,888, now U.S. Pat. No. 3,883,672 by Bone et al. also filed with the present application, a dry pet food having a marbled meat appearance is disclosed. This product was produced, however, using only one dough.

By "dry pet food" is meant one that has a moisture content less than 15 percent by weight. Hereinafter, all percentages referred to are understood to be by weight unless specified otherwise and are based upon the weight of the final product.

As disclosed in U.S. patent application Ser. No. 478,961 these foods are composed of amylaceous ingredients such as cereal grains or starch, fats, sugar, a proteinaceous adhesive, and a plasticizing agent. Additional protein source ingredients may be used as well.

By "protein source" is meant additional protein other than that obtained from the required proteinaceous adhesive. The protein source may be employed in order to satisfy the legal and nutritional requirements for protein quantity and quality in the pet food product. Typical protein source ingredients are those normally containing 20 percent or more protein by weight. Examples of protein source ingredients are soybean oil meal, soybean flour, soy protein concentrates, soy protein isolates, meat meal, meat and bone meal, fish meal, blood meal, dried blood plasma, yeast, milk proteins, dried skimmilk, cottonseed meal, cottonseed flour, cottonseed protein isolate, peanut meal, peanut flour, peanut protein isolate, corn germ, corn germ meal, wheat germ, wheat germ meal, corn gluten feed, corn gluten meal, corn distiller's dried grains, dried corn distiller's solubles, dried meat solubles, poultry by-product meal, and any other edible proteinaceous foodstuff including animal protein.

Fresh meat and meat by-products may also be employed and are particularly useful in imparting palatability. The term "meat" is understood to apply to the flesh of cattle, swine, sheep, goats, horses, whale, and other mammals, poultry, and fish. The term "meat by-products" includes such substituents as are embraced by that term in the Definition of Feed Ingredients published by the Association of American Feed Control Officials, Inc.

By the term "sugar" is meant any known sugar utilized in the food art.

While the quantity of fat and sugar is considered to be within the skill of the art, a typical quantitative range of those ingredients within each dough includes from about 0–35 percent of a protein source, from about 3–15 percent fat and from 0 to about 35 percent sugar.

Vitamin, mineral, color, flavor and other known supplements may be used as well to enhance the pet food properties. Among these are choline chloride, MgO, Vitamin A, $B_{12}$, $D_3$, and E, riboflavin, niacin, folic acid, pyridoxine HCl, thiamine mononitrate, Ca pantothenate as vitamin and mineral supplements. Such supplements are commonly used up to about 5 percent of the final product.

Briefly stated, the novel aspects of the present invention involve forming two separate doughs each containing one or more proteinaceous adhesives in combination with one or more compatible plasticizing agents. These doughs, containing different coloring additives, are combined in a manner which yields a product that is soft, resembles marbled meat, and does not stale.

The invention further contemplates using proteinaceous adhesives in a range of about 4 to about 60 percent of each dough used to form the final product. Either one or a combination of the following proteinaceous adhesives may be used to form the 4–60 percent, however, alkali modified oil seed vegetable proteins such as alkali modified soy protein isolate, alkali modified soy protein concentrates, alkali modified soy flour, or alkali modified wheat gluten are preferred.

Proteinaceous adhesives are of two general classes, natural and modified. Examples of natural proteinaceous adhesives are collagen, albumen, and casein and its salts such as sodium caseinate, calcium caseinate, potassium caseinate, magnesium caseinate, and ammonium caseinate. Examples of proteinaceous adhesives derived by modification of natural proteins are alkali modified oil seed vegetable proteins such as alkali modified soy protein, alkali modified soy protein isolate, alkali modified soy proteinates, alkali modified soy flours, alkali modified soy concentrates, alkali modified cottonseed flour, alkali modified cottonseed protein isolates, alkali modified peanut flour or meal, alkali modified peanut protein isolate, and other alkali modified proteins such as alkali modified wheat gluten, and further including alkali modified proteins such as contained in or derived from products such as yeast, blood, albumen, keratins, myosin, and other food proteins.

The term "modified protein" and "alkali modified protein" is used interchangeably herein. By modified or alkali modified protein is meant one that is subjected to an alkaline hydrolysis such as the alkaline hydrolysis of an oil seed vegetable protein such as that disclosed in copending application, U.S. patent application Ser. No. 478,751 filed June 12, 1974, now U.S. Pat. No. 3,917,877 issued Nov. 4, 1975, by Kumar et al. which is hereby incorporated by reference. Generally this modification proceeds by forming an aqueous slurry of a protein material containing at least 50 percent protein. The pH of the slurry is then adjusted to a pH of from 7 to 10.5 by adding to the aqueous slurry an alkali metal carbonate. A pH of about 8 is preferable. The slurry is then heated to react the protein with the alkali metal carbonate. The reaction temperature required depends upon the the specific protein used but generally ranges from 295° to 310° F. The slurry is then neutralized to a pH of from 6.6 to 7.0 by the addition of an edible acid. The slurry may be used as such, as an ingredient or it may be dried to remove most of the water prior to use as an ingredient. If desired, the protein may be subjected to fermentation with yeast before subjecting the protein to the alkali modification.

Plasticizing agents utilized within the scope of the invention include glycerol, sorbitol, 1,3-butanediol, mannitol, propylene glycol, and other equivalent plasticizers suitable for food use. These may include corn molasses, mono-glycerides of fatty acids, sugar or corn syrups between 20 to 50 dextrose equivalents, fats, and oils. Especially useful are the sugar and corn syrups. The quantitative range of plasticizing agent utilized in the present invention ranges from about 2 to about 40 percent of each dough used to form the final product. While the plasticizing agents listed or a combination of those listed may be used, it is preferable that from 2–15 percent of the dough within the final product consist of propylene glycol.

It is within the scope of the present invention to include amylaceous ingredients as part of one or of both doughs within the final product. As much as 25 percent may be utilized. However, it is preferable that the amount of amylaceous ingredients be minimized or even eliminated in order to enhance and maintain the meat-like texture, even upon storage. A great amount of amylaceous ingredients will yield a product less resembling meat in texture, especially during storage.

By "amylaceous ingredients" is meant those foodstuffs containing a preponderance of starch and/or starch-like material. Examples of amylaceous ingredients are cereal grains and meals or flours obtained upon grinding cereal grains such as corn, oats, wheat, milo, barley, rice, and the various milling by-products of the cereal grains such as wheat feed flour, wheat middlings, wheat mixed feed, wheat shorts, wheat red dog, oat groats, hominy feed, and any other such material. Also included as sources of amylaceous ingredients are the tuberous foodstuffs such as potatoes, tapioca, or the like.

Other examples of amylaceous ingredients are the various edible grain or tuberous starches and modified starches.

By the term "modified starch" we mean the use of thin-boiling (acid or oxidized treatment) or thick-boiling regular grain or tuberous starch, high amylose corn starch or waxy starch, or combinations thereof, either pregelatinized before, after, or distinct from the treatment with crosslinking agents such as sodium trimetaphosphate or phosphorus oxychloride alone or in conjunction with alkylating agents such as propylene oxide, or acetylating agents such as acetic anhydrides.

The invention contemplates the use of sugar because of its carbohydrate value as well as its adequacy as a plasticizer and a filler. As much sugar as 35 percent by weight of the final product may be utilized, however, it may be eliminated entirely and replaced by using a greater amount of the other ingredients.

Generally, the doughs can be produced by blending a mixture of a fat, a proteinaceous adhesive, a plasticizing agent and a sufficient amount of ingredient water to form a pet food product having a total moisture content of less than 15 percent. Additional water for processing, or process water must be added so that the dough may be manufactured into the desired product. It is to be understood that the determination of the quantity of ingredient water includes any amount of water obtained from the other ingredients. For instance, if the other ingredients yield a product having 3 percent moisture and a final product having a total moisture content of 10 percent is desired, then only 7 percent water need be added in addition to that required for processing. The dough is then cooked at a temperature between about 160° and about 300° F. In one dough a coloring agent providing a meaty color such as FD&C Red No. 40 is added while a white coloring agent such as titanium dioxide is added to the second dough. The amount of colorant additive necessary to provide the requisite color is very small, usually less than 1 percent. For best results the coloring agents are added before cooking and merely admixed with the other ingredients. The cooked doughs are then combined with one another at a rate sufficient to provide a final product having from about 70 to about 90 percent of the red dough by weight and from about 10 to about 30 percent of the white dough by weight. The combined cooked marbled dough is then cooled and collected onto a continuous conveyor and subdivided. By "subdivided" is meant that the cooked dough is severed and cut into pieces of desired size.

While the temperature range of from about 160° F. to 300° F. is sufficient to develop said meat-like texture and appearance upon cooking said mixture, the specific or preferred temperature range is from about 220° to about 270° F. wherein the process water required is present in an amount the equivalent of from about 5 parts per hundred to about 15 parts per hundred by weight of the dough.

When the quantity of process water used is less than the equivalent of 5 parts per hundred parts by weight of the dough, it may be necessary to employ a cooking temperature of 270° to 300° F. When the quantity of process water used is greater than 15 parts per hundred parts by weight of the dough it may be necessary to employ a cooking temperature of 160° to 220° F. If the cooked product contains greater than 15 percent moisture, it is necessary to include a drying step to reduce the moisture content below 15 percent.

By "process water" or "water required for processing" is meant that amount over and above formulation requirements.

The figure represents a schematic illustration of the process of the invention. After each of the doughs have been mixed, they are separately introduced into an extruder barrel. For example, the red colored dough may be introduced into extruder barrel 11 while the white colored dough may be introduced into extruder barrel 12. Each of the extruder barrels are fitted with heating jackets to maintain the extrusion temperatures between the required level of 160°–300° F. The doughs are extruded through dies 13 and 14 respectively at a rate whereby from 70 to 90 percent of the red colored dough is combined with from 10 to 30 percent of the white colored dough in die 16. Die 16 may be fitted with restrictions or baffles to achieve various degrees and forms of marbling. The temperature in the two extruders is substantially identical. After combination of the doughs in die 16 the combined extrudate 21 is cooled and collected on a continuous conveyor 17.

While not required for the formation of an acceptable product it has been found to be beneficial to inject the combined extrudate with an inert gas such as air to increase the marbling within the extrudate. This may be accomplished by injecting the gas under pressure through pipe 15 which is connected to a pressurized gas source.

If desired a water cooled conveyor system may be utilized. The cooked extrudate may then be further cooled while on the conveyor by conventional means, and passed through a dicing machine whereby the cooked extrudate is cut into bite size pieces and packaged. After dicing, but prior to packaging, it may be beneficial to further cool the product utilizing conventional means. Any suitable dicing machine may be used for this function, but one illustration of such a machine is one found in U.S. Pat. No. 2,690,011.

The type of conveyor surface receiving the extrudate depends upon the specific formulation and desired appearance of the final product and is readily determinable by one or ordinary skill in the art. The rate of transport of the extrudate through the screw extruder onto the continuous conveyor immediate to the discharge of the cooker extruder is dependant upon the specific formulation and desired appearance of the final product as well as the specific type of extruder utilized and is felt to be within the skill of the art.

In order to more fully illustrate the novel aspects of the present invention, the following examples are presented. In the examples, percentages are by weight based on the weight total of the ingredients used in processing.

EXAMPLE 1

| | % Red Meat Color Base | % Fat (White) Colored Marbling | % Total Formula |
|---|---|---|---|
| Sucrose | 29.17 | 29.41 | 29.22 |
| Collagen | 17.48 | 17.45 | 17.48 |
| Soy Protein Concentrate | 11.49 | 16.45 | 12.48 |
| Meat By-product | 6.99 | 6.98 | 6.99 |
| Sorbitol | 5.99 | 5.98 | 5.99 |
| Propylene Glycol | 5.99 | 5.98 | 5.99 |
| Meat & Bone Meal | 5.00 | — | 4.00 |
| Dicalcium Phosphate Dihydrate | 4.57 | 4.89 | 4.63 |
| Animal Fat | 3.48 | 3.49 | 3.48 |
| Sodium Chloride | 1.00 | 1.00 | .99 |
| Vitamin-Mineral Mix | .60 | — | .48 |
| Potassium Chloride | .50 | .50 | .50 |
| Potassium Sorbate | .10 | — | .08 |
| FD&C Red No. 40 | .01 | — | .01 |
| Titanium Dioxide | — | .30 | .06 |
| Water | 7.62 | 7.58 | 7.61 |

A dry pet food having a soft, elastic, meat-like texture and marbled appearance and which contains less than 15 percent moisture is produced from the above ingredients.

Each dough is processed separately in the following manner. The dry ingredients are added to a 200-lb. Ribbon Mixer and mixed for 1 minute. A 400-lb. Sigma Blade Mixer may be used as well. The wet ingredients are combined in a meat tub, hot water added and mixed by hand allowing for at least partial melting of the fat. This mixture is then poured onto the dry mix in the mixer with the mixer on and blended for three minutes. The mix was then hand-fed into a screw extruder.

The red dough is extruded at a rate capable of producing 300-lbs./hour while the white dough is extruded at a rate capable of producing 150-200 lbs./hour. The temperature is maintained at 240°–245° F. in both the extruder and the die.

The combined dough is then discharged onto an air cooled conveyor. Any conveyor system such as water cooled conveyors, may be utilized within the scope of the present invention. The speed of the belt is adjusted so as to obtain a steady stream of extrudate on the belt. A speed setting of 12 feet per minute is used to produce the product of the present example.

The product is then cooled and cut into bite size pieces. The product has a soft, marbled meat appearance which is firm, non-sticky and temperature stable. Studies prove the product to be palatable to animals.

EXAMPLE 2

Example 1 is repeated except the collagen is replaced with modified soy flour. A marbled product is obtained having a meat-like texture and appearance.

EXAMPLE 3

Example 1 is repeated except that the collagen is replaced with sodium caseinate yielding a marbled product having a meat-like texture and appearance.

The procedure of Example 1 is repeated using the ingredients of Examples 4–7. In each example a product is obtained that resembled meat in texture having a marbled appearance.

EXAMPLE 4

|  | % Red | % White |
|---|---|---|
| Sucrose | 34.1 | 34.4 |
| Collagen | 6.9 | 6.9 |
| Soy Protein Concentrate | 14.8 | 18.1 |
| Meat By-product | 9.99 | 9.98 |
| Sorbitol | 5.99 | 5.98 |
| Propylene glycol | 5.99 | 5.98 |
| Meat and bone meal | 5.00 | — |
| Dicalcium phosphate dihydrate | 4.57 | 4.89 |
| Animal fat | 3.48 | 3.49 |
| Sodium chloride | 1.00 | 1.00 |
| Vitamin-Mineral premix | .60 | — |
| KCl | .50 | .50 |
| Potassium Sorbate | .10 | — |
| FD&C Red No. 40 | .01 | — |
| Titanium Dioxide | — | .30 |
| Water | 6.97 | 8.48 |

EXAMPLE 5

|  | % Red | % White |
|---|---|---|
| Sucrose | 5.10 | 5.20 |
| Collagen | 54.00 | 55.00 |
| Soy protein concentrate | 8.00 | 7.10 |
| Meat By-product | 4.89 | 5.99 |
| Sorbitol | 4.99 | 5.99 |
| Propylene glycol | 5.99 | 5.99 |
| Meat & Bone meal | 4.00 | — |
| Dicalcium phosphate dihydrate | 2.88 | 3.24 |
| Animal fat | 2.00 | 2.15 |
| NaCl | 1.00 | 1.00 |
| Vitamin Mineral Mix | .50 | — |
| KCl | .40 | .40 |
| Potassium sorbate | .10 | — |
| FD&C Red No. 40 | .01 | — |
| Titanium Dioxide | — | .30 |
| Water | 6.14 | 7.64 |

EXAMPLE 6

|  | % Red | % White |
|---|---|---|
| Sucrose | 25.17 | 25.41 |
| Collagen | 17.48 | 17.45 |
| Soy Protein concentrate | 11.49 | 16.45 |
| Meat by-product | 6.99 | 6.98 |
| sorbitol | 5.99 | 5.98 |
| Propylene glycol | 5.99 | 5.98 |
| Meat & bone meal | 5.00 | — |
| Dicalcium phosphate dihydrate | 4.57 | 4.89 |
| Animal fat | 3.48 | 3.49 |
| NaCl | 1.00 | 1.00 |
| Vitamin-Mineral Mix | .60 | — |
| KCl | .50 | .50 |
| Potassium sorbate | .10 | — |
| FD&C Red No. 40 | .01 | — |
| Titanium Dioxide | — | .30 |
| Oat Flour | 4.00 | 4.00 |
| Water | 7.62 | 7.58 |

EXAMPLE 7

|  | % Red | % White |
|---|---|---|
| Modified soyflour | 17.48 | 17.45 |
| Soy Protein concentrate | 12.49 | 17.45 |
| Meat by-product | 6.99 | 7.98 |
| Sorbitol | 4.99 | 4.98 |
| Corn syrup | 29.17 | 29.41 |
| Propylene Glycol | 4.99 | 4.98 |
| Meat & bone meal | 6.00 | — |
| Dicalcium phosphate dihydrate | 4.57 | 4.89 |
| Animal fat | 3.48 | 3.49 |
| NaCl | 1.00 | 1.00 |
| Vitamin Mineral mix | .60 | — |
| KCl | .50 | .50 |
| Potassium sorbate | .10 | — |
| FD&C Red No. 40 | .01 | — |
| Titanium Dioxide | — | .30 |
| Water | 7.62 | 7.58 |

The dry pet food thus produced will maintain its meat-like texture and appearance during normal storage. If desired, the dry pet food of the invention may be mixed with conventional dry pet foods and marketed in that manner. Such a mixture is possible due to the low moisture content of the pet food.

Obviously, modifications of this invention are possible. It is understood, therefore, that this application is intended to cover any variations, uses, or adaptation of the invention as may be considered to be known or customary practice in the art to which the invention pertains.

Having fully disclosed and described the invention, we claim:

1. A method for the production of a dry pet food having a moisture content of less than 15 percent by weight and a soft, elastic, marbled, meat-like texture and appearance comprising the steps of forming a first dough containing a first coloring agent and a second dough containing a second coloring agent, each dough comprising a fat, a proteinaceous adhesive, and a plasticizing agent; and sufficient amount of water to produce a product having less than 15 percent by weight moisture and an additional amount of process water; wherein said proteinaceous adhesive is present in an amount of from about 4 to about 60 percent by weight of the dough and said plasticizing agent is present in an amount of from about 2 to about 40 percent by weight of the dough; separately cooking said first and second doughs at a temperature between 160° and 300° F.; combining the first dough with said second dough such that the final product contains from about 70–90 percent by weight of said first dough and from about 10–30 percent by weight of said second dough; and drying the final product sufficiently to reduce the moisture content of the final product to less than 15 percent by weight of the final product.

2. A method according to claim 1 wherein said proteinaceous adhesive is an alkali modified protein.

3. A method according to claim 1 wherein said proteinaceous adhesive is an alkali modified oil seed vegetable protein.

4. A method according to claim 3 wherein said modified oil seed vegetable protein is selected from the group consisting of an alkali modified soy protein isolate, alkali modified soy flour, alkali modified wheat gluten, and mixtures thereof.

5. A method according to claim 1 wherein said proteinaceous adhesive is selected from the group consisting of sodium caseinate, calcium caseinate, potassium caseinate, ammonium caseinate, magnesium caseinate, albumen, and collagen.

6. A method according to claim 1 wherein said plasticizing agent is selected from the group consisting of glycerol, sorbitol, 1,3-butanediol, mannitol, propylene glycol, and mixtures thereof.

7. A method according to claim 6 wherein said propylene glycol is present in an amount greater than 2 percent by weight but less than 15 percent by weight of each dough within the final product.

8. A method according to claim 1 wherein said plasticizing agent comprises an agent selected from the group consisting of corn molasses, corn syrup, and sugar syrup.

9. A method according to claim 1 further including the limitation that when said process water is used in an amount the equivalent of from about 5–15 parts per hundred parts by weight of said first dough or of said second dough or of both said first dough and said second dough, that dough is cooked at a temperature of from about 220° to about 270° F.

10. A method according to claim 1 further including the limitation that when said process water is used in an amount of less than the equivalent of 5 parts per hundred parts by weight of said first dough or of said second dough or of both said first dough and said second dough, that dough is cooked at a temperature of from about 270° to about 300° F.

11. A method according to claim 1 further including the limitation that when said process water is used in an amount greater than the equivalent of 15 parts per hundred parts by weight of said first dough or of said second dough, or of both said first dough is cooked at a temperature of from about 160° to about 220° F.

12. A method for the production of a dry pet food having a moisture content of less than 15 percent by weight and a marbled meat-like appearance and texture comprising the steps of: forming a first dough containing a first coloring agent and a second dough containing a second coloring agent, each dough comprising a fat, a proteinaceous adhesive, a plasticizing agent, and sufficient water to produce a product having less than 15 percent by weight moisture and an additional amount of process water; wherein said proteinaceous adhesive is present in an amount of from about 4 to about 60 percent by weight of the dough; said plasticizing agent is present in an amount of from about 2 to about 40 percent by weight of the dough; and heating said first dough in a first extruder barrel at a temperature between 160° and 300° F. for a time sufficient to cook said ingredients; heating said second dough in a second extruder at a temperature between 160° and 300° F. for a time sufficient to cook said ingredients; combining the cooked dough formed from the first dough and the cooked dough formed from the second dough by extruding said first dough and second dough combined through a die to form a product containing from about 70 to 90 percent by weight of a first dough and from about 10 to about 30 percent by weight of a second dough; discharging the combined dough formed from the first and second dough onto a moving conveyor; cooling and subdividing the combined dough to form pieces of dry pet food; and drying the combined dough sufficiently to reduce moisture content of the combined dough to less than 15 percent by weight of the combined dough.

* * * * *